United States Patent [19]

Hedlund

[11] Patent Number: 4,705,562
[45] Date of Patent: Nov. 10, 1987

[54] METHOD FOR WORKING-UP WASTE PRODUCTS CONTAINING VALUABLE METALS

[75] Inventor: Martin L. Hedlund, Ursviken, Sweden

[73] Assignee: Boliden Aktiebolag, Stockholm, Sweden

[21] Appl. No.: 931,688

[22] PCT Filed: Feb. 25, 1986

[86] PCT No.: PCT/SE86/00082
 § 371 Date: Oct. 27, 1986
 § 102(e) Date: Oct. 27, 1986

[87] PCT Pub. No.: WO86/05211
 PCT Pub. Date: Sep. 12, 1986

[30] Foreign Application Priority Data

Feb. 27, 1985 [SE] Sweden .............................. 8500959-5

[51] Int. Cl.⁴ .............................................. C22B 11/00
[52] U.S. Cl. .......................................... 75/83; 75/445; 75/65 R; 75/72
[58] Field of Search ................... 75/65 R, 72, 44 S, 83

[56] References Cited

U.S. PATENT DOCUMENTS

| | | | |
|---|---|---|---|
| 3,664,828 | 5/1972 | Wormer | 75/73 |
| 3,666,440 | 5/1972 | Kono et al. | 75/76 |
| 3,996,044 | 12/1976 | Petritsch | 75/44 S |
| 4,135,923 | 1/1979 | Day | 75/83 |
| 4,147,531 | 4/1979 | Miller | 75/44 S |
| 4,209,321 | 6/1980 | Harvey | 75/44 S |
| 4,415,360 | 11/1983 | Leirnes et al. | 75/65 R |
| 4,514,221 | 4/1985 | Goto | 75/63 |

FOREIGN PATENT DOCUMENTS

| | | |
|---|---|---|
| 77128 | 4/1983 | European Pat. Off. . |
| 1309739 | 3/1973 | United Kingdom . |
| 2092618 | 8/1982 | United Kingdom . |

*Primary Examiner*—Peter D. Rosenberg
*Attorney, Agent, or Firm*—Burns, Doane, Swecker & Mathis

[57] ABSTRACT

The invention relates to a method for working-up valuable metal-bearing waste products, particularly but not exclusively copper scrap, containing a substantial amount of organic constituents, to a product form suitable for recovering the valuable-metal content, while expelling the organic constituents by pyrolysis and/or combustion in a reactor which rotates about its longitudinal axis and which is provided with a common reactor charging and reactor emptying opening. This invention is characterized in that, subsequent to expelling at least the major part of the organic content, the resultant residual products in the reactor are brought into close contact with a molten bath which is obtained from any metal-sulphide material and which contains at least a metal-sulphide phase or a metallic phase capable of dissolving at least the valuable-metal content of the residual product. Subsequent to dissolving and expelling respectively substantially all the material originally charged to the reactor, the metal values are recovered from the metal-sulphide phase and/or the metallic phase, in a suitable conventional manner.

15 Claims, 1 Drawing Figure

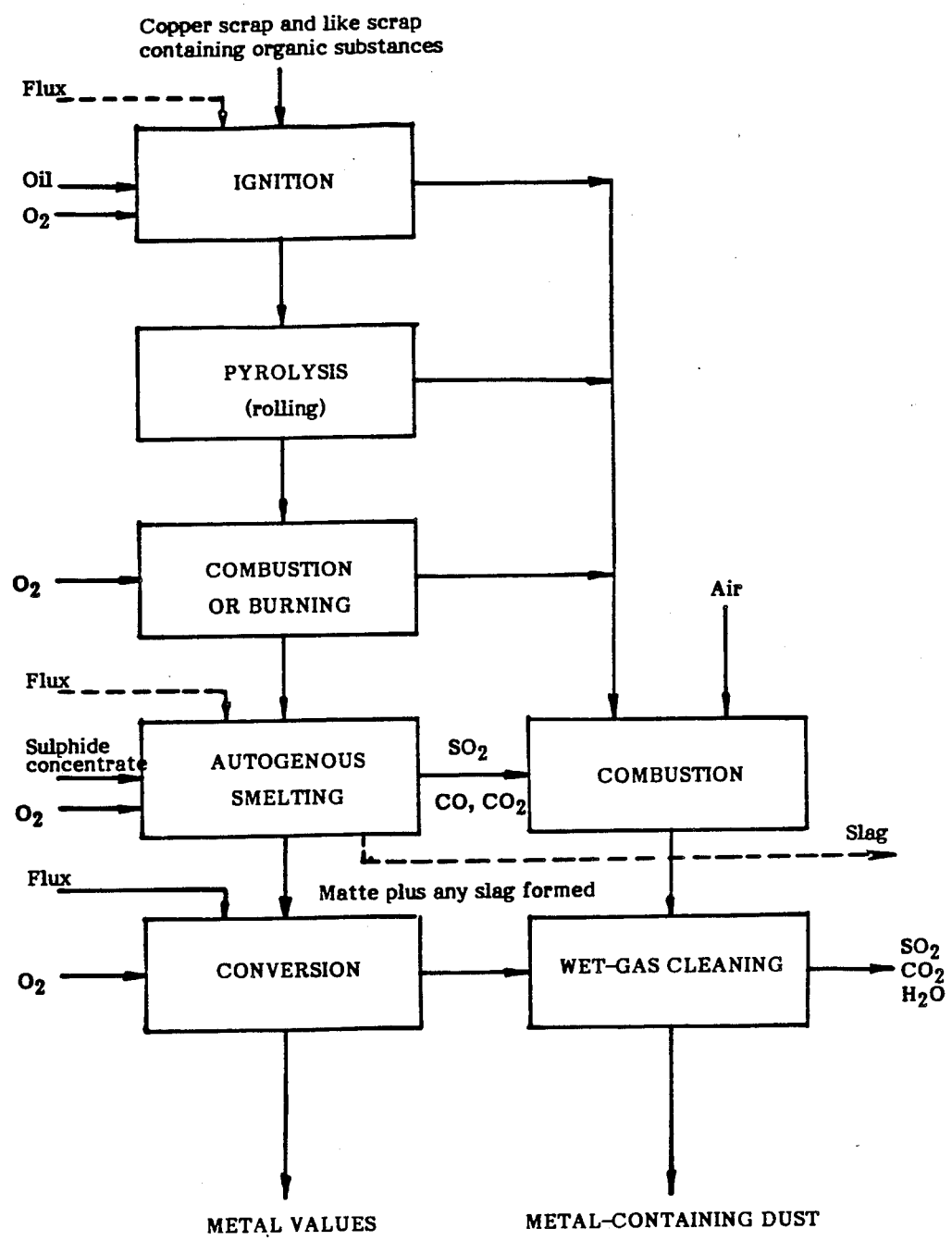

METHOD FOR WORKING-UP WASTE PRODUCTS CONTAINING VALUABLE METALS

The present invention is concerned with a method of working-up waste products which contain valuable metals and which predominantly comprise organic constituents, into a product form from which the valuable metal content thereof can be readily recovered. More specifically the invention relates to the expulsion of organic constituents by pyrolysis and/or by combusting said constituents in a reactor which can be rotated about its longitudinal axis and which is charged and emptied through one and the same reactor opening. The invention relates in particular, although not exclusively, to the working-up of combustible copper scrap, such as electric-cable scrap and electronic scrap materials, which often contain other essential metal values, such as precious metals for example. In addition to such materials, the invention can also be used to work-up other secondary materials which contain metal values, for example lead scrap, such as battery scrap, and alloyed steel scrap, such as stainless steel. By metal values is meant here, and in the following, primarily non-ferrous metals, such as copper, nickel, cobalt, lead, tin and precious metals. The organic substances present are often from the group of plastics, rubber, paper, oil, tar, and greases. When working-up secondary materials of the aforesaid kind, it is essential that losses are kept low, both from an economic aspect and an environmental aspect.

According to a method devised by Boliden and described and illustrated in SE-B-8104490-1 and other, corresponding national specifications, for example U.S. Pat. No. 4,415,360, metal-bearing waste products containing substantial quantities of organic material are worked-up by pyrolysis and/or combustion of the organic material in a rotating reactor, in the manner indicated in the opening paragraph of this specification. When practising this known method, the inorganic metal-bearing product which remains after expelling all the organic constituents present in the original starting material is removed from the reactor in the form in which it is found upon completion of the pyrolysis/combustion process, optionally after at least partially melting-down the residual product. According to this prior art publication, the reactor temperature is therewith raised to 1050°–1100° C. with the aid of an oil-gas burner, thereby partially melting-down the metals present in the scrap. This partially molten content is then removed from the reactor and is allowed to cool in a ladle, to form a porous lump which is held together by a solidified metal layer at the bottom of the lump. The pyrolysed or combustion residue material is thereafter transferred in its then solid form to a suitable pyrometallurgical smelter, in which it is worked-up and the metal content thereof extracted, or is optionally partially melted-down and solified to form porous lumps, prior to being charged to the smelter. This smelter may be a Pierce-Smith-converter in which, in accordance with conventional copper manufacturing techniques, the copper matte is converted to blister copper, while slagging the iron content of the copper matte and oxidizing its sulphur content. The smelting of scrap material in copper converters, however, creates many problems, even though a number of the problems normally encountered can be substantially overcome by practising the method described and illustrated in our earlier patent specification. One of the most serious problems encountered in this respect is that combusted scrap residues contain a large quantity of finely divided material, which creates large amounts of dust when handled and when charged to the converter. As indicated above when describing the scrap combusting method of our earlier published specification, this problem can be overcome to a large extent by partially melting-down the combustion residue, such that part of the fine fraction thereof is melted-down or absorbed in the resultant molten bath.

Due to their weight and size, however, the porous lumps obtained when practising the aforedescribed known method do not present a particularly attractive alternative form of furnace charge. For example, it is difficult in practice to charge these lumps to the reactor without subjecting the interior thereof to heavy mechanical impact forces, resulting in increased wear on the brick lining of the reactor. It has also been found that the lumps are slow to break-up in the reactor. Generally speaking, for reasons of safety all types of combusted scrap residues must be pre-heated for at least one hour in the converter, before conversion can commence. The solid scrap material is permitted to cool in the converter for some period of time subsequent to the commencement of the conversion process, and hence it is necessary to maintain the requisite high converter temperature by blowing gas rich in oxygen through the molten bath, in order to prevent constant blockage of the tuyeres by freezing. Subsequent to the scrap melting, iron and zinc for example, present in the scrap, will oxidize while generating large quantities of heat, and hence the temperature pattern in the reactor varies greatly during the conversion process.

Consequently, there is a need for a method which will enable combusted copper-scrap residues and other residues containing valuable metals and substantial quantities of organic substances to be worked-up and processed in a simple and effective manner, inter alia in those cases where it is desired to integrate the handling of such waste materials with a conventional copper smelting plant incorporating converters for converting copper matte to blister copper.

The object of the present invention is to provide such a simplified method for working-up and processing scrap material of the aforesaid kind, in which the important advantages obtained when pyrolysing and combusting organic constituents of the waste products in a rotating reactor, as described in the introduction, are combined with a simplified additional treatment of the combusted-material residues, and in which the disadvantages previously encountered when further processing combusted-scrap residues in copper converters are substantially eliminated. The reference to rotatable reactors made here and in the following is not directed exclusively to rotary converters of the kind mentioned and inferred in our earlier published specification, but also includes other rotatable reactors which incorporate a single, common reactor-charging and reactor-discharging opening, and in which a melt can be treated, for example, such rotary furnaces as short-drum furnaces.

This object is achieved by means of the method according to the invention, which is characterized by the procedural steps set forth in the following claims.

Thus, in accordance with the invention the organic content of the material is first pyrolysed and/or combusted in a manner described in our earlier patent specification SE-B- 8104490-1 (U.S. Pat. No. 4,415,360). Subsequent to expelling at least the major part of the organic content by pyrolysis and/or combustion, the resultant solid combustion-residue is brought into close contact with a molten bath present in the reactor formed by the aid of metal sulphide material. The molten bath is either generated in the furnace in which case the metal sulphide material may be charged to the reactor in a solid state as the bath is generated, or in an earlier stage in the process, for example prior to charging the waste products to the reactor. Alternatively, a preprepared molten bath may be charged to the reactor at that time when the solid combustion residues are to be brought into close contact with the molten bath.

The bath is preferably generated by flash smelting metal sulphide autogenously with oxygen gas, suitably with the aid of a concentrate/oxygen-gas burner inserted into the reactor through the common reactor charging and emptying opening.

It will be understood, however, that the molten bath can be generated in ways other than by flash smelting. For example, it lies within the scope of the invention to generate the bath by combusting fossil fuels, in which case metal sulphide materials other than concentrates can be melted down. As before indicated, such material can also be melted down externally of the reactor and charged to the reactor in liquid form, subsequent to expelling at least the major part of the organic content of the waste materials, and therewith form at least a part of the molten bath with which the solid combustion residues are to be brought into close contact. In this respect there is chosen a metal sulphide material which will provide a molten bath that comprises a metal sulphide phase and/or a metallic phase, and optionally also an oxidic slag. The metal sulphide phase may suitably comprise a copper matte, i.e. a copper-iron based sulphide melt. Embodiments which include this preferred product will be discussed in more detail hereinafter. The metallic phase can comprise a molten lead bath capable of dissolving substantial quantities of valuable metals, or alternatively a speiss, i.e. a substantially sulphur-free metal alloy incorporating antimony and/or arsenic, which speiss, inter alia, dissolves such metals as iron, nickel, cobalt, tin and copper.

The slag is given the composition desired by charging a suitable flux, preferably silica, to the reactor, either in conjunction with the flash-smelting phase or prior thereto, for example together with the waste materials prior to the pyrolysis/combustion phase. The slag formed is optionally separated from the bath, subsequent to substantially all of the combustion residues of the waste products having melted or dissolved in the bath, or having been expelled therefrom. The metal values incorporated in the metal-sulphide phase and/or the metallic phases are then recovered in a conventional manner.

When copper matte is formed, the matte is removed from the reactor, suitably after optionally separating the slag from the bath, and passed to the conversion stage of a conventional copper smelter, where the matte is further processed and the metal values thereof recovered. It is also possible, however, to use the reactor in which the waste products were combusted to convert the copper matte into white metal, i.e. pure copper sulphide, or blister copper, and to pass the white metal or blister copper for further processing in a suitable, conventional manner. The copper matte can be transferred to the conversion stage in a liquid state, for example with the aid of ladles, or can be solidified and crushed and then transferred to said stage in a solid form. Both of these matte transfer possibilities are of interest from a technical aspect, and both methods are free from the aforedescribed problems experienced when transferring scrap combustion residues to the converter.

In those cases a molten lead bath is obtained when carrying out the method, the slag formed is suitably separated from the bath and the bath transferred to a conventional lead refiner in a lead smelter, thereby enabling the metal values to be recovered during the course of conventional refinement processes. The lead can be transferred to the lead smelter in a liquid state, if this is possible and desirable in practice, or can be cast into ingots and transferred to the smelter in a solid state.

Contact of the solid combustion residues with a molten bath comprising a metal-sulphide phase and/or a metallic phase, and optionally a slag phase, in accordance with the invention, facilitates conversion of the solid combustion residues to a molten state even in the presence of high-temperature melting metals, for example metals of the iron group, which are readily dissolved in and absorbed by the metal-sulphide phase and the speiss phase, or other high-temperature melting constituents, such as metals from the vanadium and chromium groups for example, or different metal oxides which can be dissolved in and absorbed by both the metal-sulphide phase and the metallic phase and, in addition, an optional slag phase, in varying degrees of chemical distribution.

The method according to the invention will now be described in more detail with reference to a flow sheet and a number of exemplifying embodiments.

The single FIGURE of the accompanying drawing is a flow sheet illustrating a preferred embodiment of the invention, in which a matte is formed by autogenously smelting sulphide concentrate.

It will be seen from the flow sheet that the method can be divided into a number of process stages, of which the majority are carried out in one and the same reactor, for example a rotary converter or rotary furnace, whereas the last process stage, the conversion stage, shown in the flow sheet is preferably carried out in a copper converter forming part of a conventional copper smelter.

Copper scrap of the type generally referred to as combustion scrap i.e. scrap containing substantial amounts of organic constituents, is charged to the rotatable reactor. In addition to copper scrap it is also possible to work-up other waste products containing organic material and important metal values. When the furnace is hot, the furnace charge is normally ignited immediately upon entering the furnace. The reaction can be assisted, however, by optionally charging a small quantity of oil to the reactor. Oxygen gas is blown into the furnace, and the furnace temperature rapidly rises. The major part of the organic material present is vaporized in the furnace, and the combustible gas generated is combusted in the converter hood with the aid of secondary air, resulting in an increase in the hood temperature. Vaporization continues autogenously as the furnace rotates, in the absence of an oxygen-gas supply. A decrease in the hood temperature indicates that the rate of vaporization is decreasing. The next phase, i.e. the combustion stage, is now initiated by introducing oxygen-gas into the furnace.

Subsequent to combusting the major part of the organic material, metal sulphide and oxygen gas are supplied to the furnace in proportions such as to obtain an autogenous smelting of the concentrate, so-called flash smelting, to form a molten bath containing a metal-sulphide phase and an oxidic slag phase.

Fluxes for obtaining the correct slag composition are supplied either in conjunction with the flash smelting process or even as early as when the scrap is charged to the furnace, as indicated in broken lines in the flow sheet. The rate at which concentrate is supplied is adapted to the gas capacity of the furnace hood, i.e. so that all of the gas leaving the furnace is able to pass into the hood above said furnace, and so that no gas consequently passes beyond the hood externally thereof. When all organic material has been expelled, and consequently no further combustion gas is generated, the rate at which concentrate is supplied can be increased to a level optimal with respect to the furnace in question, which in the case of a Kaldo-converter of average size is from 500–700 kg/min for example.

The gases of combustion generated in the furnace are first combusted with secondary air in the furnace hood and then passed to a wet gas-cleaning system for extracting the dust content of said gas.

The molten bath generated autogenously in the furnace progressively dissolves the solid scrap residue remaining from the combustion phase, this dissolution being assisted by both the molten sulphide and the molten slag. The sulphide bath is highly capable of dissolving, for example, copper, nickel and iron, which are normally the major constituents of this kind of scrap. The precious metals present are also effectively absorbed in the sulphide phase. Certain constituents will be dissolved in the slag.

The autogenous smelting phase is terminated when substantially all of the combustion residue material has been dissolved in the molten bath. The molten bath is transferred to the conversion stage, either in its entirety or subsequent to separating the slag phase therefrom, as indicated in the flow sheet. The molten bath may be transferred in its molten state, or alternatively in a solid state, subsequent to being solidified and crushed.

It may be necessary in certain cases to pre-treat the bath prior to its conversion, for example by refining the matte in a ladle or in a rotary converter. In this latter respect, the rotary converter may comprise the furnace unit in which the original scrap material was combusted and autogenously smelted, or may comprise a furnace unit separate hereto. This pre-treatment process may be necessary when working-up and/or autogenously smelting highly contaminated material containing substantial quantities of arsenic, antimony or bismuth.

Samples of the matte phase can be taken prior to passing said phase to the conversion stage, so as to ensure that only acceptable contents of certain elements, for example nickel, will be passed to the converter.

Similar flow sheets can, in principle, be utilized for working-up processes in which the molten bath comprises a metallic phase, with the exception of the conversion stage.

EXAMPLE 1

A series of three tests were carried out in accordance with the method of the invention, in which the combustion and smelting furnace was a Kaldo converter. These tests are described below.

Three tons of each of the following copper-scrap qualities were treated in each test: Electronic, "tele"(93 0) and "Ludd" (93R) having the following typical analyses.

|  |  | 93 O | 93 R |
|---|---|---|---|
| Cu | % | 24.4 | 31.9 |
| Au | g/t | 6.7 | 24 |
| Ag | g/t | 2078 | 807 |
| Fe | % | 44.9 | 5.5 |
| Ni | % | 1.3 | 0.6 |
| Zn | % | 2.7 | 3.1 |
| Pb | % | 0.3 | 0.5 |
| Sb | % | 0.01 | 0.01 |
| $SiO_2$ | % | 7.4 | 7.4 |
| MgO | % | 11.1 | 11.1 |

The scrap was first pyrolysed and combusted for about 50 min. During this period the converter was rotated at a speed of 2–3 rpm. The combustion process required a total oxygen-gas input of about 500 $m^3$.

After a time lapse of about 50 min autogenous smelting of a copper concentrate, type Aitik, in an amount of about 500 kg/min was commenced with the aid of a concentrate/oxygen-gas burner to which 140 $m^3$ oxygen-gas was also charged for each ton of concentrate. A typical analysis of the concentrate used is:

|  | weight-% |
|---|---|
| Cu | 26.4 |
| Fe | 30.7 |
| Zn | 0.3 |
| Pb | 0.2 |
| As | 0 |
| S | 32.8 |
| $SiO_2$ | 6.0 |
| $Al_2O_3$ + MgO + CaO | 2.4 |
|  | g/t |
| Au | 13.3 |
| Ag | 167 |

1.2 tons of silica per 30 tons of concentrate were charged to the converter batchwise from a silica-containing hopper.

The input of concentrate was interrupted from time to time, in order to carry out temperature checks and to check the converter as a whole. Subsequent to having charged about 30 tons of concentrate to the converter, it was found that the scrap in all tests had been dissolved. The matte and slag formed could be tapped-off at 1140°–1200° C.

Each test resulted in about 6 tons of slag and 25 tons of matte containing about 38% copper. More specified information concerning the average slag and matte compositions in the various tests is set forth in the table below.

| Analysis | | MATTE | | | SLAG | | |
|---|---|---|---|---|---|---|---|
| test |  | 1 | 2 | 3 | 1 | 2 | 3 |
| Cu | % | 36.4 | 37.1 | 36.6 | 2.65 | 0.88 | 0.98 |
| Fe | % | 32.3 | 31.2 | 30.6 | 40.3 | 41.6 | 31.8 |
| Ni | % | 0.28 | 0.21 | 0.27 | 0.02 | 0.01 | 0.02 |
| Zn | % | 0.50 | 0.90 | 0.96 | 2.59 | 1.33 | 1.20 |
| Pb | % | 2.9 | 1.8 | 2.5 | 2.0 | 0.8 | 0.3 |
| Ag | g/t | 760 | 730 | 700 | — | — | — |
| $Al_2O_3$ | % |  |  |  | 5.9 | 6.9 | 4.1 |
| CaO | % |  |  |  | 3.4 | 2.1 | 2.8 |
| $SiO_2$ | % |  |  |  | 23.4 | 26.3 | 30.7 |

Of the amount of matte formed, about 60% was delivered in a liquid state to the converters and there converted without difficulty. The remaining 40%, or thereabouts, was allowed to solidify and then crushed. The matte was porous and readily crushed. No iron had precipitated out. The slag formed was dumped without further treatment.

EXAMPLE 2

24 tons of battery, or accumulator, scrap were divided into six charges each of about 4 tons and charged to a Kaldo-type converter; the batteries were empty of liquid and in their original form. Each batch was combusted with about 80 m$^3$ oxygen-gas prior to charging the next batch. Subsequent to charging the last batch in line, a further 100 m$^3$ oxygen-gas, or thereabouts, were charged to the converter for final combustion of its organic content. The major part of the lead content had by then collected in a molten lead phase having a temperature of about 1000° C., whereas residues of the battery casings and impurities had formed non-melted lumps on the lead bath.

Lead concentrate was then charged through a burner lance extending through the converter opening, and flash smelting of the lead concentrate was commenced with the aid of oxygen-gas. The concentrate had previously been admixed with flux and oxidic return dust. Lead was formed during the autogenous smelting phase and a molten lead bath was obtained in the converter together with the molten lead present therein, and a slag. The solid battery residues were dissolved in the resultant slag and lead bath. During this melting process, the concentrate mixture was charged to the converter at a rate of 450 kg/min, together with an addition of 25 m$^3$ air and 66 m$^3$ oxygen gas, all calculated per minute.

Upon completion of the autogenous smelting process and dissolution of the battery residues in the liquid bath and slag formed, the slag contained 25% lead, this content being reduced to 3% by reduction with coke, whereafter the slag was tapped-off. The lead phase was then tapped-off and treated in a conventional lead refiner.

The table below sets forth the analyses and quantities of the ingoing materials and the outgoing products.

TABLE

| | Quantity ton | Pb % | S % | Fe % | Zn % | SiO$_2$ % | CaO % | MgO + Al$_2$O$_3$ % |
|---|---|---|---|---|---|---|---|---|
| Ingoing material | | | | | | | | |
| Lead batteries (accumulators) | 24 | 60 | 3 | | | 2 | 0.6 | 1 |
| Lead concentrate | 20 | 50 | 18 | 4 | 9 | 5 | 1 | 1 |
| Return dust | 6 | 50 | 10 | | | | | |
| Lime | 2.2 | | | | | | 90 | |
| Cold fayalite slag | 2 | | | 36 | | 38 | 3 | |
| Outgoing products | | | | | | | | |
| Lead | 24 | 99 | 0.3 | | | | | |
| Slag (reduced) | 11 | 3 | 1 | 14 | 15 | 21 | 21 | 2 |

I claim:

1. A method for treating valuable metal-bearing waste products containing a substantial amount of organic constituents comprising:
    (a) heating the waste products in a reactor which rotates about its longitudinal axis and which is provided with a common reactor opening for charging and emptying the reactor so as to combust or pyrolyze at least a major part of the organic constituents which is expelled from the reactor thereby forming residual products in the reactor;
    (b) adding metal sulphide material in solid form to the reactor;
    (c) heating the metal sulphide material in contact with the residual products in the reactor so as to form a molten bath containing at least a metal sulphide phase or a metallic phase having dissolved therein at least the valuable metal content of the residual products; and
    (c) recovering the valuable metal content.

2. The method of claim 1 wherein the metal sulphide material includes metal sulphide concentrate which is smelted autogenously to form the molten bath.

3. The method of claim 2 wherein a flux is charged to the reactor to form a slag phase.

4. The method of claim 1 wherein a flux is charged to the reactor to form a slag phase.

5. The method of claim 4 wherein the flux is charged with said waste products.

6. The method of claim 5 wherein a metal sulphide phase is formed, is removed from the reactor and is passed to a copper smelter.

7. The method of claim 6 wherein the slag phase is removed from the reactor prior to removing the metal sulphide phase from the reactor.

8. The method of claim 7 wherein a metallic lead phase is formed and that the metallic lead phase is passed to a lead smelter.

9. The method of claim 1 wherein a metallic lead phase is formed and that the metallic lead phase is passed to a lead smelter.

10. The method of claim 1 wherein a metal sulphide phase is formed, is removed from the reactor and is passed to a copper smelter.

11. The method of claim 1 wherein the organic constituents are expelled by pyrolysis.

12. The method of claim 1 wherein the organic constituents are expelled by combustion.

13. The method of claim 1 wherein the valuable metal bearing waste products are copper scrap.

14. The method of claim 1 wherein the valuable metal content is recovered from a metal sulphide phase.

15. The method of claim 1 wherein the valuable metal content is recovered from a metallic phase.

* * * * *